(12) United States Patent
Howard

(10) Patent No.: US 6,272,947 B1
(45) Date of Patent: Aug. 14, 2001

(54) STEERING SHAFT CENTERING ASSEMBLY

(76) Inventor: Durrell U. Howard, 306 Krameria Dr., San Antonio, TX (US) 78213

( * ) Notice: Subject to any disclaimer, the term of this patent is extended or adjusted under 35 U.S.C. 154(b) by 0 days.

(21) Appl. No.: 09/468,867

(22) Filed: Dec. 21, 1999

(51) Int. Cl.[7] ..................................................... B62D 1/20
(52) U.S. Cl. ........................... 74/499; 74/388 PS; 280/90
(58) Field of Search ............................. 74/499, 388 PS, 74/496, 492, 89.25; 280/90, 89.13, 89.11

(56) References Cited

U.S. PATENT DOCUMENTS

| | | |
|---|---|---|
| 3,084,566 | 4/1963 | Pistillo . |
| 3,171,298 | 3/1965 | Henry-Biabaud . |
| 3,426,612 | 2/1969 | Henry-Biabaud . |
| 3,593,592 | 7/1971 | Adams . |
| 3,627,346 | 12/1971 | Dorner et al. . |
| 3,654,820 | 4/1972 | Shachter . |
| 3,888,328 | 6/1975 | Leiber . |
| 4,410,193 | 10/1983 | Howard . |
| 4,418,931 | 12/1983 | Howard . |
| 4,534,577 | 8/1985 | Howard . |
| 4,558,878 | 12/1985 | Motrenec . |
| 4,566,712 | 1/1986 | Motrenec . |
| 4,634,135 | 1/1987 | Nakata et al. . |
| 4,669,567 * | 6/1987 | Nakamura et al. ................... 180/140 |
| 4,736,962 | 4/1988 | Motrenec . |
| 5,527,053 | 6/1996 | Howard . |
| 5,536,028 | 7/1996 | Howard . |
| 5,816,594 | 10/1998 | Howard . |
| 6,003,887 * | 12/1999 | Howard ............................. 280/89.11 |

FOREIGN PATENT DOCUMENTS 60-189673 * 9/1985 (JP) .................................. 74/388 PS

* cited by examiner

Primary Examiner—David Fenstermacher
(74) Attorney, Agent, or Firm—Connolly Bove Lodge & Hutz

(57) ABSTRACT

A steering shaft centering assembly for resisting off-center movement of the steerable wheels of a vehicle and for returning them to a selected center position after each such movement. The centering assembly includes a screw member connected between an idler shaft and an input shaft connected by gearing to a steering shaft of the vehicle steering system. A centering cylinder contains the screw member, a screw follower for engaging the screw member, a pair of pistons, and a reciprocating member for engaging the pistons in response to movement of the screw follower. Movement of each piston in a corresponding centering chamber is resisted by a resilient force, and this resilient force causes the reciprocating member to resist axial movement of the screw follower, which in turn resists rotational movement of the screw member, such that off-center movements of the steering shaft and of the steerable wheels are resisted by the centering assembly. The resistance force, the return force and the selected center position may be varied remotely.

20 Claims, 7 Drawing Sheets

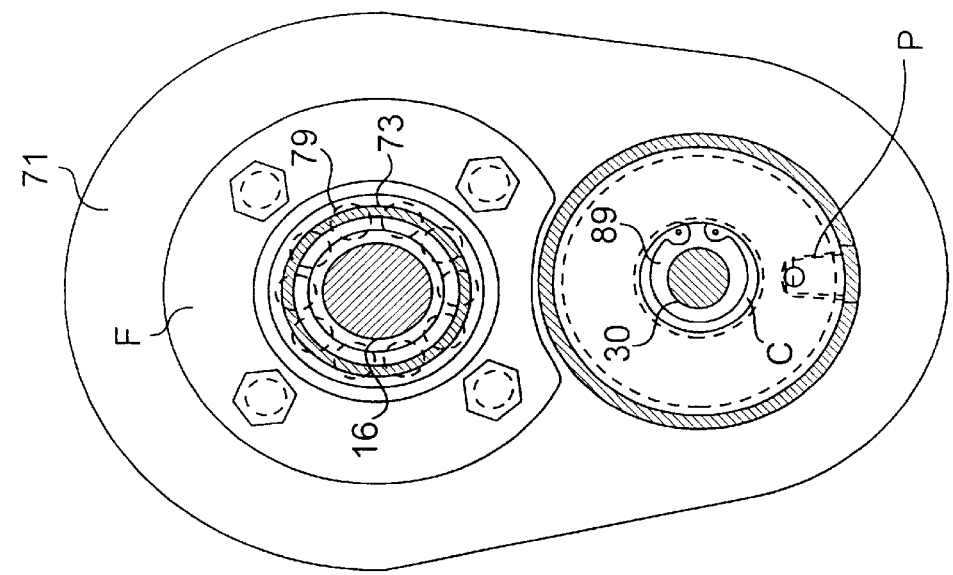
FIG. 6
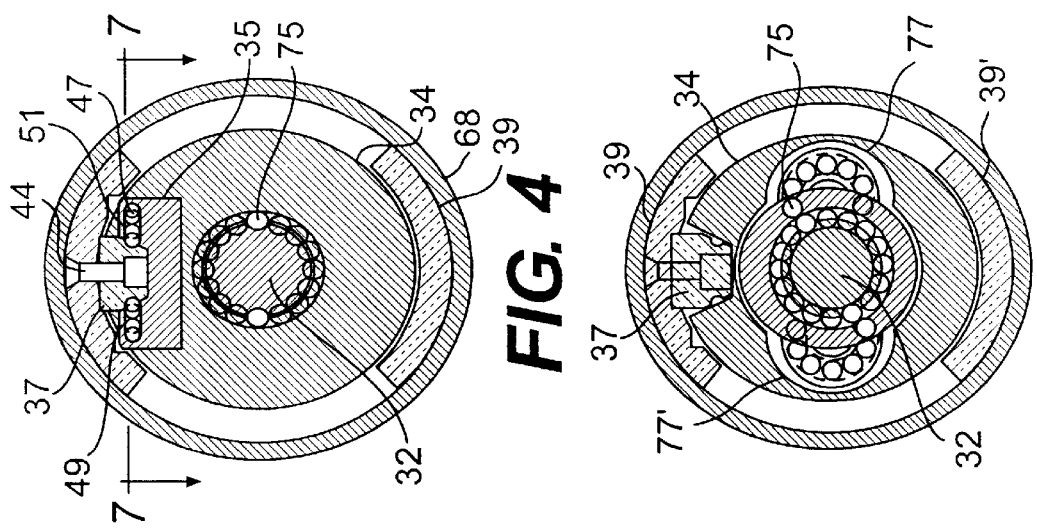
FIG. 4
FIG. 5
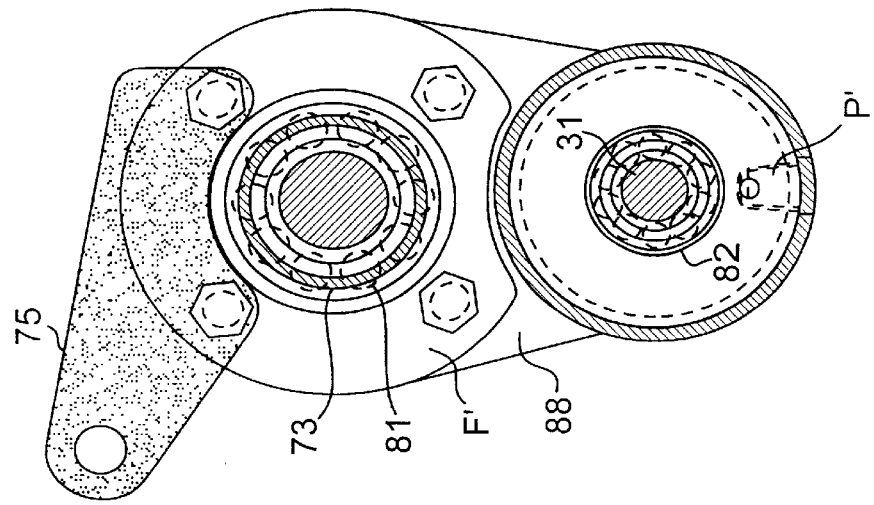
FIG. 3

STEERING SHAFT CENTERING ASSEMBLY

FIELD OF THE INVENTION

This invention relates to vehicle steering systems and more particularly to a centering device for controlling the steering system of a large motor vehicle, such as a tandem truck, a motor home, a bus, or a specialty vehicle with steered rear wheels such as a fire engine or a long tandem bed vehicle for hauling large special objects of unusual shape. A steering shaft is controlled so that a center steering position is selected and maintained for two or more steerable wheels of the vehicle in spite of spurious steering inputs, such as those caused by variable crosswinds, crowned or slanted roadways, or other factors tending to adversely affect vehicle steering by the driver.

BACKGROUND OF THE INVENTION

The steering systems of motor vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

The effects of any spurious steering inputs also are magnified as the size and weight of the vehicle increases. A particularly unstable vehicle is one of the tandem type where one or more trailer sections are towed by a cabin or engine section having front steerable wheels, and the aft wheels of the last trailer section also are steerable, such as is the case with the ladder section of a fire engine and with the last section of tandem trailer beds of specialty vehicles for carrying large and/or heavy equipment or other objects of unusual shape.

In other words, in such specialty vehicles both the front pair of wheels and the rear pair of wheels are steerable. In the case of fire engines, the ladder section often has a second steering wheel requiring a second operator. However, in the case of other specialty vehicles, it is preferable that both the front steerable wheels and the rear steerable wheels be controlled by a single steering wheel and operator in the vehicle cab, an arrangement that can be particularly unstable because of the length of the steering train and of the number of steering shafts and linkages involved.

One drawback of prior art steering systems is that spurious inputs transmitted from the roadway through the steerable wheels affect substantially the entire steering assembly and the only stabilizing resistance is provided by the driver's manipulation of the steering wheel. The negative action of the steerable wheels is caused by spurious steering inputs from crosswinds, slanted or crowned roads, bad road surfaces, and other adverse dynamic steering forces. As described further below, inherent geometric steering characteristics also may be responsible for spurious steering inputs. The transmission of these various inputs between the steerable wheels and the steering wheel causes steering system oscillations and vehicle wandering that require constant corrections and therefore produce driver fatigue.

The transmission of these spurious inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore contribute to driver fatigue.

Vehicles with steering systems having positive caster generally track relatively straight ahead and resist steering inputs away from center, including those of the driver, provided that the roadway they are travelling on is smooth and is not slanted or crowned. Such positive caster is provided by positive caster offset, which is also known as mechanical trail. Caster offset is the distance from the ground intersection point of a pivot line drawn through the pivot axis of a steerable wheel to a contact point at the center of the area over which the wheel contacts the ground. The pivot axis of a steerable wheel of a motor vehicle is usually provided by a "king pin". Because the contact point of a steerable wheel with positive caster trails the pivot line point of the wheel, side forces cause the wheel to turn in the direction that the force is being applied. A good example of this is the way in which the castered wheels on the front of a shopping cart are easily turned in the direction of applied force.

The adverse effects described below are some of the negative aspects of achieving steering stability with positive caster offset. Because of the side force applied by gravitational pull on a slanted or crowned highway, positive caster offset causes a motor vehicle to freely turn to the low side, creating a steering wheel pull that requires counteractive steering input from the driver to keep the vehicle from leaving the highway. The amount of driving fatigue that is directly caused by positive caster offset under these conditions may be appreciated by considering the many millions of miles driven by truck drivers and other motorists each day on crowned or slanted highways.

Another fatiguing driving condition that may be encountered by a motorist is that of controlling a crosswind steering input. The amount of adverse steering input caused by crosswinds is directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind when combined with positive caster offset. Positive caster offset also allows steering inputs from rutted and other imperfect roadway surfaces to steer back against the driver and thereby cause road wander, which is a universal driving complaint, particularly by driver's of heavy vehicles such as trucks and motor homes.

For the lack of a more advanced method, steerable wheel castering has been accepted by the industry as a low-cost method of achieving steerable wheel returnability. Thus, large, heavy over-the-road vehicles are presently provided with generous amounts of positive caster. Not much thought has been given to the self-defeating side effects of steerable wheel castering. Instead, the lack of directional stability is blamed on the size and weight of the vehicle.

As the size and weight of over-the-road vehicles increases, the need for directional stability becomes more important. Learning to drive a heavy vehicle means learning to control the back steer caused by the adverse side effects of steerable wheel castering. The failure of the industry to recognize the critical need to provide directional stability by replacing steerable wheel castering with another method of achieving steerable wheel returnability may go down in history as one of the longest enduring heavy vehicle design oversights.

The lack of directional stability is fundamentally the reason that heavy vehicle driving is much more stressful than it otherwise needs to be. Keeping a heavy vehicle, that is lacking in directional stability, tracking straight and under control for extended periods of time is a major cause of driving fatigue and related accident potential. The failure of numerous driver fatigue and alertness studies to consider the contribution made by "driving" fatigue in the overall evaluation is indicative of the wide-spread failure of the industry to recognize the lack of directional stability as the major cause of driver fatigue resulting from driving fatigue. Accordingly, a dramatic reduction in driver fatigue may be made by making heavy over-the-road vehicles directionally stable and thereby significantly reducing driving fatigue.

The term "directional stability" does not legitimately apply to the current production of heavy vehicles because they are, in fact, not directionally stable. The lack of heavy vehicle directional stability is not the fault of the steering gear. The purpose of past improvements in the art of steering gears and other steering components has been to make it easier for the driver to control the unstable behavior of castered steerable wheels. Irrespective of such refinements in the steering gear and related components, when the steerable wheels are allowed to caster, the driver will still have to make the same excessive number of steering corrections to control road wander, slanted road steering wheel pull, and down wind steerable wheel castering.

Thus, a highly important consideration that has long been overlooked by the industry is that steerable wheel castering is directly responsible for road wander, crowned road steering wheel pull and cross wind steering problems. Keeping an unstable heavy vehicle tracking straight and under control currently requires an inordinate amount of driver steering corrections to counteract the adverse side effects of castered wheels. The repetitive task of making thousands of precise steering corrections mile after mile weighs heavily on a driver's physical and mental well-being, and may result in extreme driving fatigue. Thus, vehicle directional stability especially for heavy vehicles can only be achieved by stabilizing the on-center behavior of the steerable wheels with a more suitable method than the traditional steerable wheel castering used on all current production vehicles.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

It is believed that directional stability of motor vehicles, particularly heavy vehicles, can only be achieved by stabilizing the return-to-center and on-center behavior of the steerable wheels with a more suitable method than the traditional steerable wheel castering used on all current production vehicles. When the steerable wheels are stabilized, there is a considerable reduction in the amount of corrective steering required by the vehicle driver, resulting in a major reduction in driving fatigue. Therefore, the purpose of the present invention is to provide on-center and return-to-center improvements in steering systems for motor vehicles by adding a steerable wheel centering feature to prior art steering systems.

The primary function of present state of the art power steering systems is to assist the driver when turning away from center. When the driver releases the steering wheel By after turning, a rotary valve in the steering gear is returned to neutral by a torsion rod arrangement. When this rotary valve is in its neutral position, the power steering gear has no influence on the direction of the steerable wheels. This arrangement or operating mode is called "free return" and allows the influence of the road surface and the steering geometry to cause the steerable wheels to return to a center position. In the center position, conventional steering units do not control the steerable wheels except in response to corrective steering inputs transmitted from the driver through the steering shaft.

The present invention provides a steering compensator for returning turned steerable wheels to a remotely adjustable on-center position, and for keeping the steerable wheels tracking straight ahead in the on-center position, such that they will respond only to intentional steering inputs by the vehicle driver. The invention also allows the driver to easily make small adjustments in the center position of the steering system to fine tune steering of the vehicle during its operation. Such fine tuning is made while driving, and makes driving more pleasurable and less fatiguing. The invention thus comprises a power centering compensator having a center position which is remotely adjustable to permit the driver of the vehicle to change and reset the center position of the steering system to compensate for new or changed steering forces which would otherwise cause the vehicle to deviate from its straight ahead course.

The invention therefore provides improved on-center and away-from-center control of the steering column and any other steering shafts connected thereto, and significantly reduces driver fatigue, because it results in a major reduction in driver steering inputs. Any positive castering present is overridden by this control. The invention also eliminates the need for any positive castering by providing directional stability of the steerable wheels when there is no positive caster, i.e., a caster angle of zero degrees (0°). Thus, on-center tracking of the steerable wheels is achieved by a means that does not have the deficiencies inherent in positive caster offset, and this substantially reduces the need for corrective steering inputs from the vehicle driver. The positive on-center feel of such a directionally stable vehicle provides a new level of driveability for motor vehicles, including trucks, buses, campers and motorized homes, and specialty vehicles for hauling heavy objects. The invention thus achieves new levels of directional stability and driveability, which reduce driver fatigue to a level that cannot be achieved by conventional positive caster centering.

The invention also allows the driver to easily make small adjustments in the centered position of the steering system to fine tune steering of the vehicle during its operation. Such fine tuning is made while driving, and makes driving more pleasurable and less fatiguing. The centering apparatus of the invention thus comprises a steering shafting centering assembly having a center position that is remotely adjustable to permit the driver of the vehicle to change and reset the center position of the steering system to compensate for new or changed steering forces which would otherwise cause the vehicle to deviate from its straight ahead course.

In addition, the centering assembly of the invention provides remotely adjustable levels of resistance force for opposing off-center steering movements and of centering force for returning the steering system to its center position after a turning movement. The adjustment means also provides for different levels of steering force to initiate or breakaway into a steering movement away from center. This level of force is sometimes referred to in this specification as the "break away resistance". Different levels of break away resistance and of resistance force may be appropriate to compensate for different steering system characteristics on the same or different types of vehicles and/or for changes in the forces acting upon the vehicle. The level of break away resistance and of resistance force opposing movement away from center may be remotely adjusted either by a control mechanism operable by the driver or by a speed control mechanism responsive to the speed of the vehicle.

The centering force for returning the steering system to center may also be remotely adjusted either by a control mechanism operable by the driver or by a speed control mechanism responsive to the speed of the vehicle. In the present invention, the level of this return force may be the same as or may differ from the resistance force level. Both the resistance force and the return force provided by the centering system are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The centering system may be left on continuously because it will automatically turn off with the ignition and come back on when the engine is started. With any malfunction of the vehicle's power steering, an automatic disabling feature of the invention shuts the system completely off.

In the absence of the centering system, spurious inputs to the steering assembly of vehicles with positive caster require almost constant manipulation of the steering wheel by the driver and make it almost impossible for the driver to hold the vehicle on a true straight ahead course. When provided on steering systems with no caster or with negative caster, the invention provides the driver with a positive touch control not heretofore attainable with those types of systems. Positive stability is thereby achieved for otherwise marginally stable or previously unstable steering systems.

The invention also provides a distinctive feel when approaching or leaving the center position. Thus, the sense of touch is added to the visual sense to aid control of the vehicle and reduce driver fatigue. The turning resistance selected should satisfy the road feel desired by the driver and be sufficient to overcome anticipated spurious inputs.

The centering system is useable with both power and non-powered steering systems, with the level of compensating forces provided usually being less for vehicles without power steering. However, use of the centering system with power steering systems is preferred because the size and weight of the centering assembly components may be less since the resistance and return forces applied to the steering shaft are magnified by the power steering system before being applied to the steerable wheels.

Although the present invention is particularly useful as a centering system for large tandem type motor vehicles, it can be employed to position the shaft of any steerable member moveable to either side of a preselected position by a steering wheel connected to the steerable member by the steering shaft. For example, the centering apparatus can keep an outboard motor centered so that a boat follows a straight course over the water in the presence of spurious steering forces produced by wind and wave action. The centering system can also be used to center such steerable members as the rudders of ships or airplanes.

The steering shaft centering assembly of the present invention comprises a centering shaft and a piston and cylinder unit mounted in parallel with and connected to a vehicle steering shaft. The centering assembly comprises two centering chambers, both preferably in a single centering cylinder or shell and each containing an independently movable piston. Between the two pistons is an actuator component comprising a screw shaft connected through a gear train to the vehicle steering shaft. Surrounding and engaging the screw shaft is a screw follower member. The screw and follower may be of conventional design, such as a ball screw and nut assembly or an ACME type screw and nut assembly. For example, a ball screw may be used with one or more ball nuts of conventional design. The screw follower is fixed to an inner carriage or shuttle having push tubes at its respective ends, each of which is adapted to engage a corresponding one of the pistons. The shuttle also carries a ball bearing unit arranged to slidingly engage an outer guide rail fixed to the cylinder shell by a guide plate to prevent the screw follower from rotating with rotation of the screw shaft when it rotates with the steering shaft as acted upon by the steering wheel of the vehicle.

An input portion of the screw shaft passes through an input end cap of the centering cylinder and a corresponding one of the pistons, and an idler portion of the screw shaft passes through the other piston and an idler end cap of the centering cylinder. The idler end cap has a thrust bearing for rotatably receiving the idler shaft portion and the input end cap has a roller bearing for rotatably receiving the input shaft portion, an extension of which carries a driven gear engaged by a driving gear carried by the steering shaft. The gear ratio of the driving gear to the driven gear is preferably in the range of 1 to 10, more preferably 1.5 to 5, most preferably about 2.0.

Each piston is adapted to reciprocate in its corresponding centering chamber, which is located between a corresponding end of the guide rail mounting plate and the corresponding end cap. By reason of this arrangement, the guide plate serves as a stop defining the rest (on-center) positions of the pistons, and one piston controls vehicle turning movement in one direction and the other piston controls vehicle turning movement in the other direction. Compressive (away-from-center) movement of each piston is resisted by the resilient force of a resilient means, such as fluid pressure or a coil spring in the centering cylinder.

A pressurized fluid may be maintained in the respective piston chambers by a fluid system connected to each chamber through a corresponding port. The fluid pressure in the respective chambers provides a base level of resistance force for constantly resisting steering column movement away from center in response to spurious steering inputs, as well as a steering force applied to the steering wheel. The fluid pressure or other resilient force also provides a return force for returning the pistons and the steering column to their center or neutral positions upon cessation of the steering force.

The fluid system may include pressure control means for providing a selected pressure in each of the piston chambers, and rotation of the steering column away from its center position is opposed by this pressure acting through a corresponding one of the pistons, depending on the direction of steering wheel rotation. The acted upon piston therefore applies a resilient force to the threads of the screw member via the sliding inner carriage and the screw follower fixed thereto.

A particularly important feature of the invention is the provision of a remotely operable trimming assembly for controllably varying the center or other preselected position of the steering column as maintained by the centering assembly. The remote trimming assembly preferably comprises opposing flanges fixed to a clamping band around the centering cylinder, which is arranged to be rotated by the screw member when the clamping band is loose. Rotation of the centering cylinder with the screw member changes the center position of the steering shaft, as well as the center positions of the steering wheel and the steerable wheels connected to the steering shaft. A piston rod passes through one flange and is secured to the other so that a trim piston connected to the rod may be pushed in one direction to pull the flanges together in a band tightening position and in the opposite direction to let the flanges move apart in a band loosening position, the band being made of spring steel. When the band is tightened, it clamps the centering cylinder in a fixed position relative to the vehicle frame so that the cylinder no longer turns with the screw member but is held in a new position establishing a new center position for the steering system.

The fluid provided to the centering chambers, as well as to the trim cylinder, may be either a gas or a liquid. The pressure of this fluid may be varied remotely to change both the resistance force opposing movement of the steering shaft away from a center position, and the return force provided for returning the steering shaft to its center position upon release of the steering wheel. Where the fluid system utilizes a liquid, the pressure control means may include a pressure accumulator for storing fluid energy and a differential pressure valve requiring a chamber pressure higher than accumulator pressure for steering column movement away from center. The stored fluid energy also provides the return force for returning the pistons to their rest or inactive positions upon cessation of a steering force.

Use of a differential pressure valve establishes an additional level of resistance to compressive movement of the pistons such that turning of the steering wheel requires a steering force sufficient to overcome the total resistance to fluid flow represented by the accumulator pressure and the differential pressure in combination. An orifice may be placed in series with the differential pressure valve to limit the rate of piston movement away from center by further increasing the level of fluid resistance as the rate of flow through the valve increases after breakaway from the center position.

Free return flow from the accumulator to the pressure chambers upon cessation of a steering force may be provided by a line containing a check valve in parallel with the differential pressure valve and orifice. This parallel line may also contain an orifice for controlling the rate at which the steering column may be returned to its center position.

Other embodiments of the invention comprise other means of causing the pistons to apply a resilient force to the screw follower, and thereby to the screw threads. For example, the two centering chambers for housing piston movement may be combined with a single vacuum chamber between the two pistons and the necessary vacuum may be provided by the vacuum available from the manifold of a combustion engine. In this embodiment, the respective centering chambers on the outer side of each piston is vented to ambient pressure. As another alternative, the respective centering chambers may each contain a relatively heavy coil spring on the outer side of each piston for resiliently forcing the pistons against the corresponding ends of the guide plate.

The preferred embodiments of the present invention may therefore include the following features: resistance force for opposing steering movement away from center, return force for return to center of sufficient magnitude to overcome spurious steering inputs, remotely variable levels of resistance force and return force through a predetermined range of turning movement, remotely trimmable center position, no substantial overshoot, fail-safe mode for disabling the centering assembly in the absence of power steering, precision centering, dampening of erratic steering movements, compact size, economical to manufacture and install, utility for old and new vehicles with or without power steering, and distinctive driver road feel.

BRIEF DESCRIPTION OF THE DRAWINGS

The invention, both as to its structure and operation, may be further understood by reference to the detailed description below taken in conjunction with the accompanying drawings in which:

FIG. 3 is a transverse sectional view taken along lines 3—3 of FIG. 2;

FIG. 4 is a transverse sectional view taken along lines 4—4 of FIG. 2;

FIG. 5 is a transverse sectional view taken along lines 5—5 of FIG. 2;

FIG. 6 is a transverse sectional view taken along lines 6—6 of FIG. 2;

DETAILED DESCRIPTION OF THE INVENTION

Figure 1:
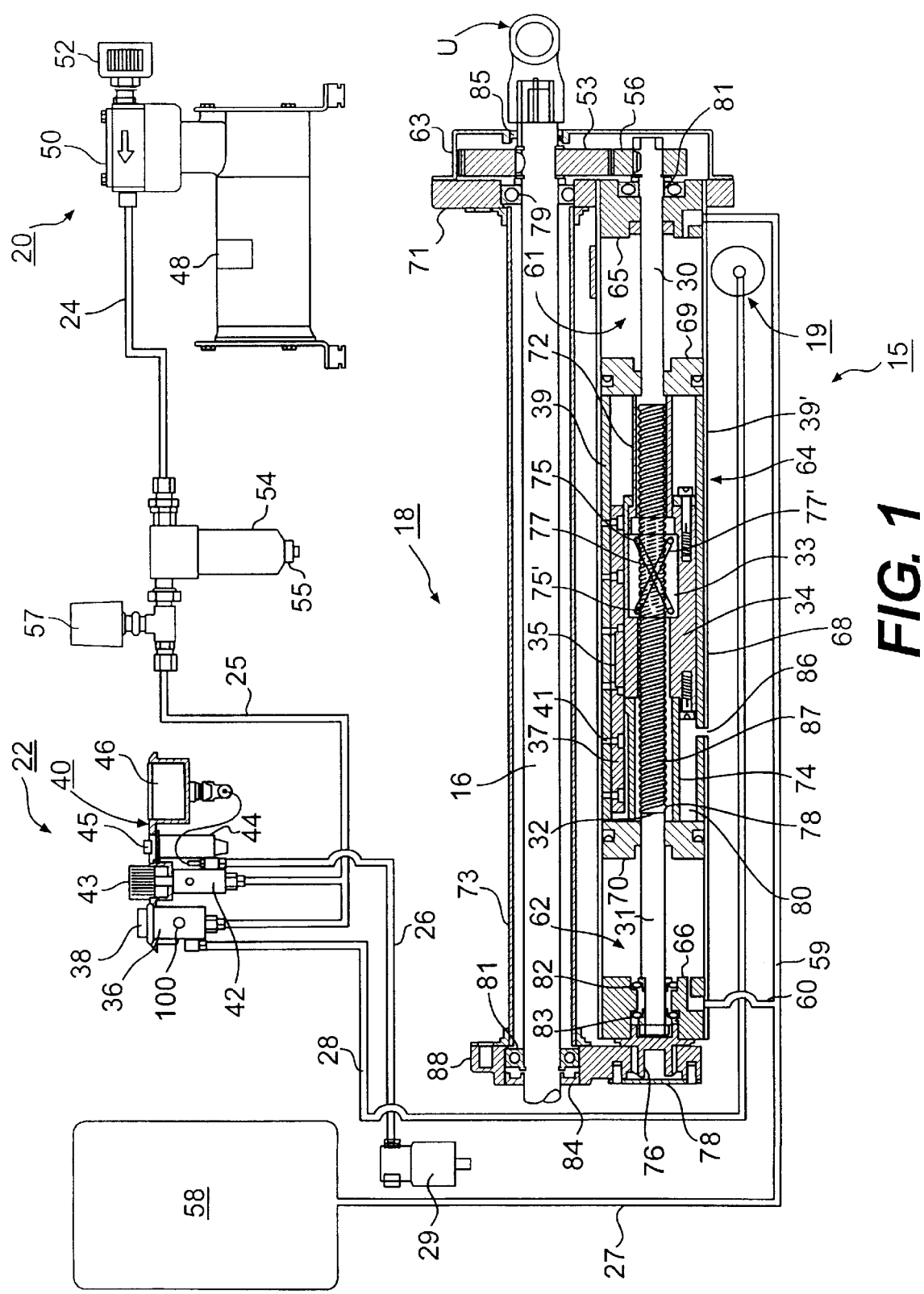
FIG. 1 is a schematic diagram of the fluid and electrical systems and of the major components of the invention, and includes a side elevational view in section showing structural details of the centering assembly.

The steering shaft centering system of the present invention, generally designated 15, comprises a centering assembly 18 connected to and in parallel with a steering shaft 16 of a motor vehicle as shown in FIG. 1 of the drawings. Pressurized air is supplied to the centering assembly 18, to a trim assembly 19 and to an air accumulator tank 58 from an air supply assembly 20 via a control assembly 22, these assemblies being interconnected by appropriately sized air lines 24, 25, 26, 27 and 28.

Mounted on a control panel 40 of control assembly 22 is an air pressure regulator 42 having a manual adjustment knob 43, an on/off power switch 44 having a push button 45, an air pressure gauge 46, and a trim valve 36 having a push button 38.

Pressurized air is supplied to the air pressure regulator 42 by the air supply assembly 20, which comprises an air compressor 48, an intake and discharge manifold 50, a solenoid actuated dump valve 52 for depressurizing the air supply assembly, an air filter and dryer unit 54 having a moisture drain valve 55, and an adjustable pressure actuated cut-off switch 57 for cutting the air compressor on and off depending on the desired output pressure in line 25. Air pressure above that desired for operating the centering assembly is supplied from supply assembly 20 to regulator 42 by the air output line 25, and then the desired regulated air pressure is supplied to the centering assembly 18 via the regulated air supply line 26, which contains an air dump valve 29 and supplies two branch air lines 59 and 60. Branch line 59 supplies pressurized air to a first pressure chamber 61 via a port P in an input end cap 65, and branch line 60 supplies pressurized air to a second pressure chamber 62 via a port P' in an idler end cap 66.

Figure 7:
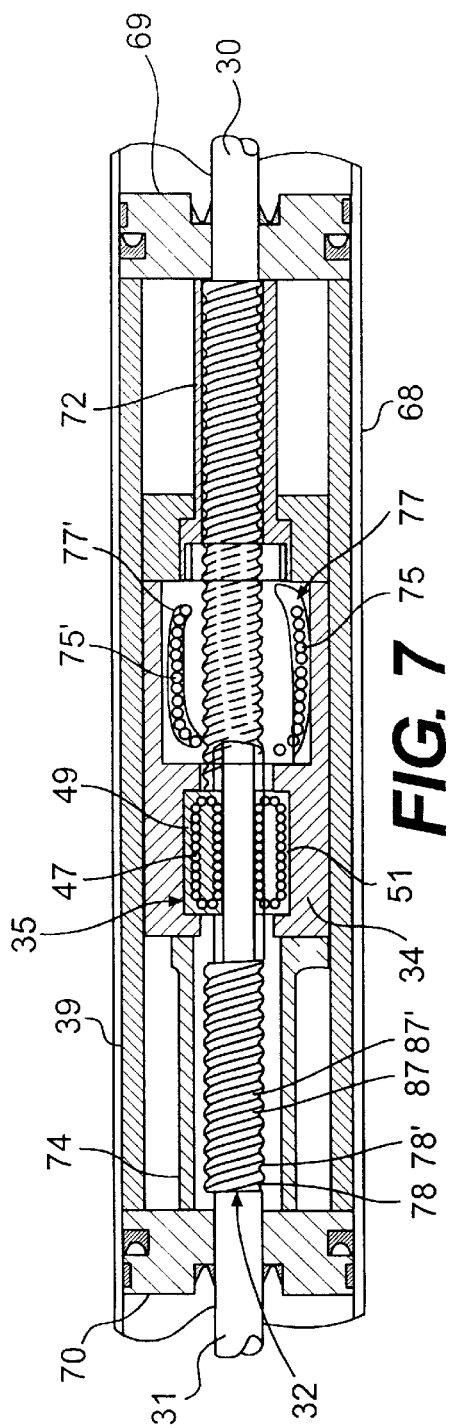
FIG. 7 is a fragmentary axial sectional view taken along lines 7—7 of FIG. 4.

Referring now to FIGS. 2 through 7, the centering unit 64 includes a centering cylinder 68 closed by the input end cap 65 and the idler end cap 66. Cylinder 68, together with the end caps 65 and 66, encloses the two separate interior pressure chambers 61 and 62, chamber 61 containing a centering piston 69 and chamber 62 containing a centering piston 70. Rigidly secured between the proximate ends of an input shaft 30 and an idler shaft 31 is a ball screw 32 engaged by one or more ball nuts 33. The ball nut 33 is rigidly fixed within an inner carriage unit 34 having a bearing slide 35 engaged with and arranged for linear travel along a guide rail 37 as best shown in FIGS. 4 and 7. Outer guide rail 37 is rigidly fixed by rivets 41 to a guide plate 39 mounted on the inside wall of cylindrical housing 68. Ball screw 32 and ball nut 33 are preferably of the dual race type as shown in FIG. 5. Ball bearings 47 within the guide slide 35 are provided in continuous (endless) oval tracks 49 and 51 formed within the slide as shown in FIG. 7.

The respective input and idler shafts 30 and 31 of the centering unit rotate with the steering shaft 16, and therefore the shaft 30 is journaled for rotation in a bearing 81 in input end cap 65, and shaft 31 is journaled for rotation in bearing 82 and a thrust bearing 83 in the idler end cap 66. The cap apertures for shafts 30 and 31 also contain appropriate seals for maintaining pressurized fluid within the pressure chambers 61 and 62, such as seal S held in place by spring clip C in end cap 65.

Rotation of the steering shaft 16 is transmitted to the input shaft 30 via a driving spur gear 53 and a driven spur gear 56 enclosed within a housing 63. The housing 63 is secured to an input end mounting plate 71, which is fixed to a steering shaft shell 73 by a flange F and supports for sliding rotation the centering cylinder 68 for the trimming function described below. The shell 73 encloses and serves as a housing for a major portion of the steering shaft 16 and is secured at its other end to an idler end mounting plate 88 by a flange F'. Mounting plate 88 is secured against rotation by a stabilizer strut 75 (FIG. 3) that may be attached to the vehicle frame at any convenient place. Idler end mounting plate 88 also receives and supports an end stub 76 about which end cap 66 may slidingly rotate. The end stub 76 has a protective cover 78 secured to the mounting plate 88. The steering shaft 16 is rotatably received in a bearing 79 carried by input mounting plate 71 and in a bearing 81 carried by idler mounting plate 88, bearing 81 being protected by a seal 84 and bearing 79 and gears 53 and 56 being protected by a housing seal 85.

The steering shaft 16 may be the steering column of the motor vehicle or a linkage shaft between gearing actuated by the steering column and gearing connected to a steerable wheel for causing its pivotal movement about a kingpin. In the drawings, both ends of steering shaft 16 may have a universal joint connector U so that shaft 16 may serve as such a linkage shaft.

The way in which the components of the centering assembly center and stabilize a vehicle steering system will now be described with reference to FIGS. 8 and 9. Since the rotational position of the centering cylinder 68 is usually fixed relative to the vehicle frame and the engagement between the guide slide 35 and guide rail 37 prevent rotation of the ball nut 33 relative to centering cylinder 68, rotation of the ball screw 32 in response to turning of the steering shaft 16 by the steering wheel (not shown) causes the ball nut 33 to move axially along the ball screw 32, the direction of movement depending on the direction of rotation of the steering wheel.

Figure 8:
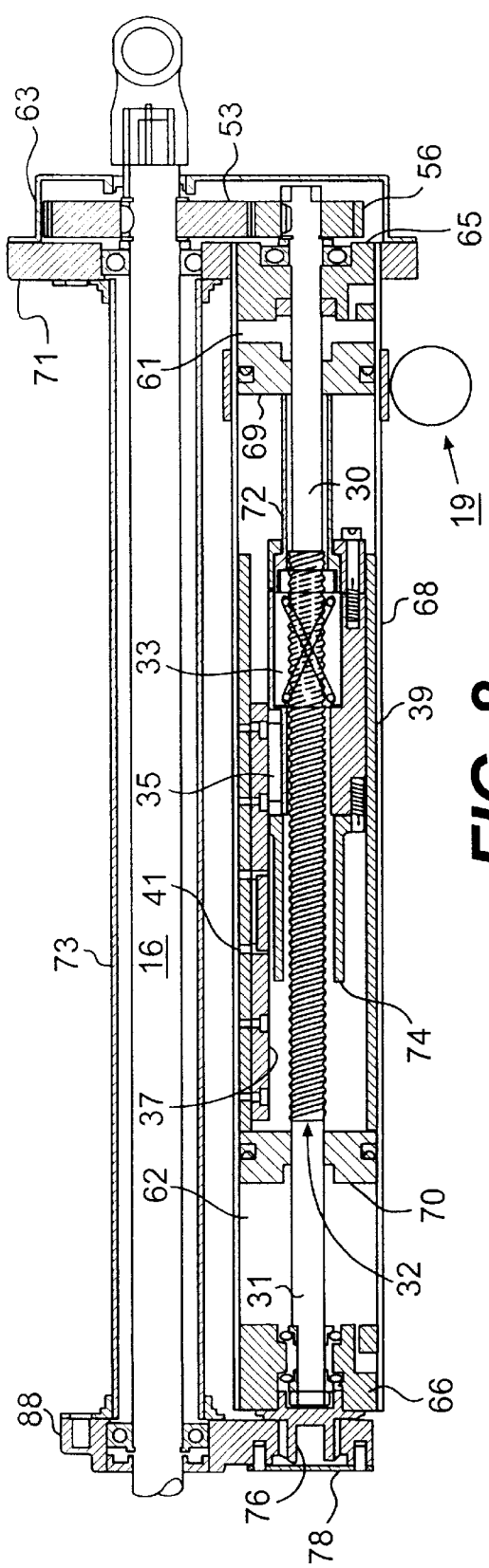
FIG. 8 is the same sectional view as FIG. 2, except the steering and input shafts have been turned away from their center up positions so that the right piston and related components are in their biasing positions for causing a return to center.
Figure 9:
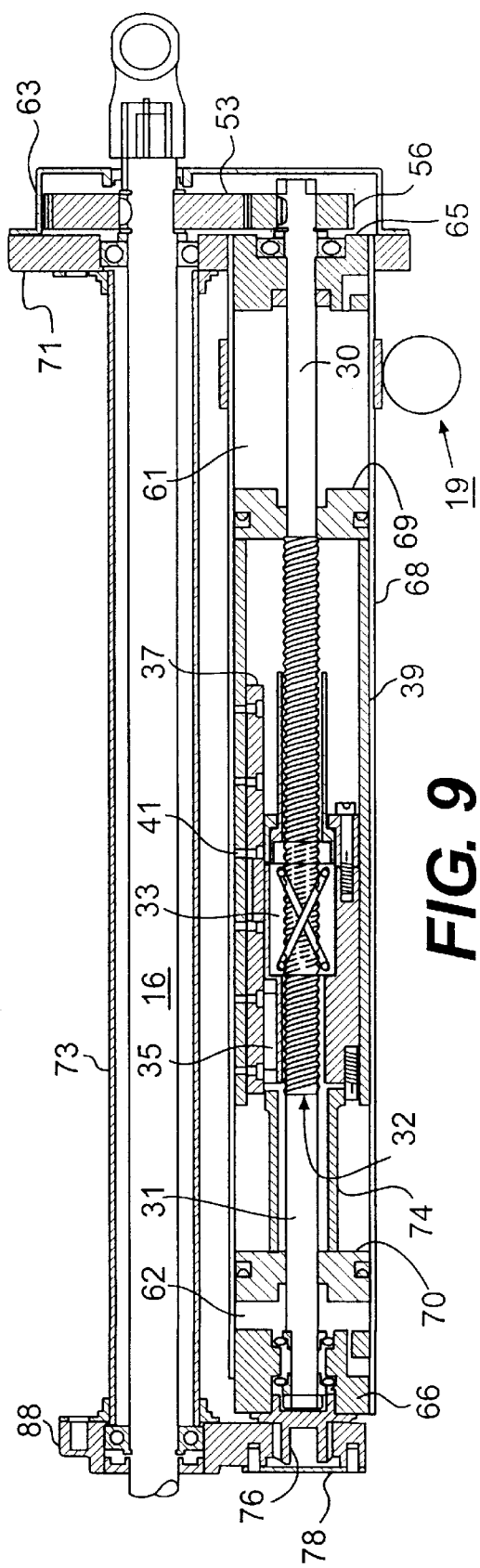
FIG. 9 is the same sectional view as FIG. 2, except the steering and input shafts have been turned away from their center positions so that the left piston and related components are in their biasing positions for causing a return to center.

The effect of such rotation of the ball screw is shown in FIG. 8 where rotation of the input shaft 30 clockwise, as viewed from the right side, has caused the ball nut 33 to move toward the right side of the figure along with the carriage 34 to which it is rigidly fixed. This causes a right push tube 72 on the carriage 34 to drive piston 69 toward the right against the action of the fluid pressure in chamber 61. In other words, since rotation of the ball nut 33 is prevented by the intermeshed slide 35 and guide rail 37, rotation of the ball screw 32 causes the ball nut to advance to the right along the axis of the ball screw 32.

Where rotation of the input shaft 30 is counterclockwise as illustrated in FIG. 9, the ball nut 33 is moved toward the left side of the figure along with the carriage 34 to which it is rigidly fixed. This causes a left push tube 74 on the carriage 34 to drive piston 70 toward the left against the action of the fluid pressure in chamber 62. So that pistons 69 and 70 will move freely in response to rotation of screw 32, a vent hole 86 is provided for venting to ambient pressure the internal chamber 80 between pistons 69 and 70. The pistons 69 and 70 are journaled by appropriate seals, and by appropriate packing and/or bearings, for both rotational and sliding movements relative to the steering input and idler shafts 30 and 31, respectively.

The fluid pressure in chambers 61 and 62 thereby resiliently opposes rotary motion of the steering wheel and the connected steerable wheels away from the selected center position by reason of the interaction between the two sets of balls 75 and 75' of the ball nut 33 and the dual spiral threads 78 and 78' (i.e. double pitch) of the ball screw 32.

During rotation of the screw 32, the balls 75 and 75' travel continuously through the dual races provided by two ball nut groves each opposite to a corresponding portion of one of the spiral screw grooves 87 and 87'. The opposing grooves of the ball nut 33 are also in the form of a spiral and the balls traveling in each of the two spiral races are returned from the end of their race to the beginning of this race via the corresponding external return tubes 77 and 77', in accordance with the usual structure of ball screw and nut assemblies. One such assembly is available as a Rockford Ball Screw Assembly from Rand Industries, Inc., of Rockford, Ill.

Figure 2:
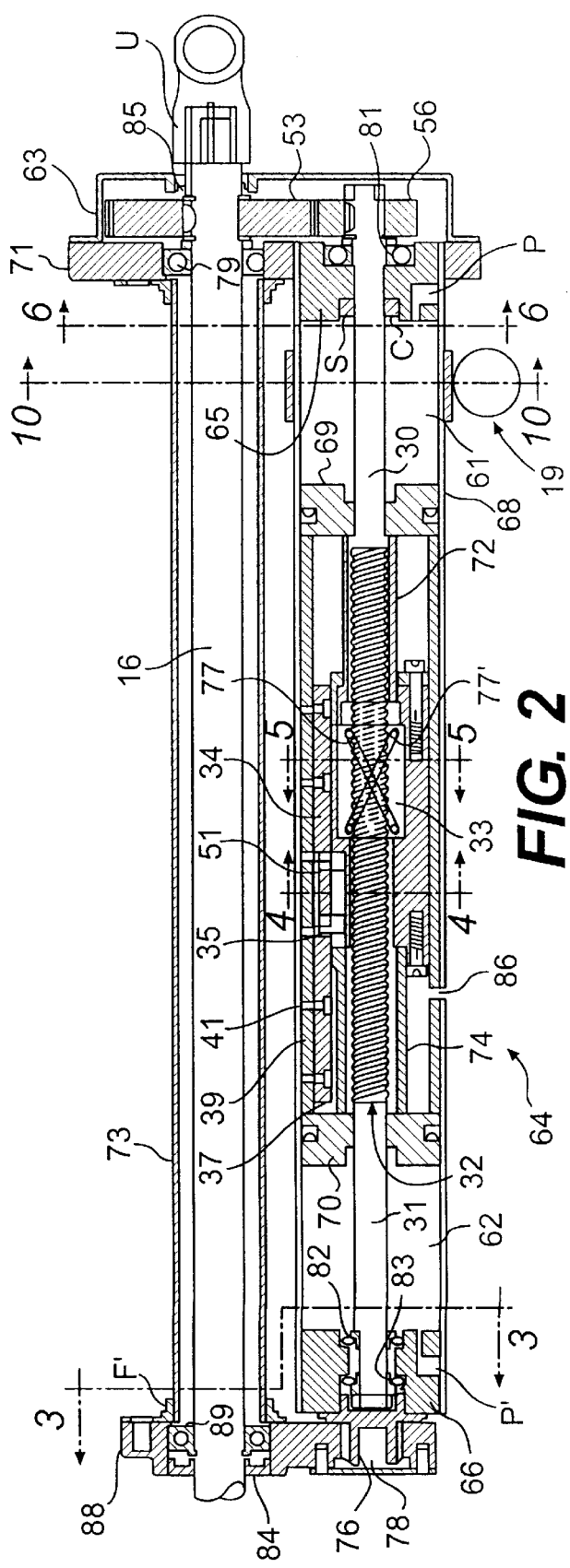
FIG. 2 is an enlarged sectional view of the centering assembly portion of FIG. 1.

Thus, movement of the ball nut 33 from the position shown in FIG. 2 to the position shown in FIG. 8 is resisted by the pressure in chamber 61 and to the position shown in FIG. 9 is resisted by the pressure in chamber 62, such that a resistance force opposes all off-center movements of the steering wheel and the connected steerable wheels. Similarly, while the ball nut is moved away from the neutral or rest position shown in FIG. 2, the pressure in chambers 61 and 62 applies a return force to the ball screw 32 by creating a resilient bias on piston 69 or piston 70 and the ball nut 33 tending to return them from the positions shown in FIGS. 8 and 9 to the positions shown in FIG. 2. This return force will cause the steering wheel and the steered wheels to return to their center positions when the steering wheel is released by the driver.

Pistons 69 and 70 are both arranged for compressive movement toward the opposite ends of their respective centering chambers, piston 69 traveling in chamber 61 and piston 70 traveling in chamber 62 within the cylinder 68. The retracted position of each piston is defined by the respective ends of the guide mounting plate 39, which serves as a piston stop and preferably has an axial length substantially (preferably within one-ten thousandth of an inch) equal to the axial length of the ball nut carriage 34 plus the extended portions thereof provided by the push tubes 72 and 74, which together define the overall carriage length. A piston stop length greater than the overall carriage length is undesirable because gaps between opposing surfaces would allow unbiased movement (slack) between the carriage and the respective pistons. A piston stop length less than the overall carriage length is also undesirable because this would let fluid flow back and forth between chambers 61 and 62 through the connecting conduits 59 and 60 so that the pistons 69 and 70 would move (drift) together until one of them bottomed out against the guide mounting plate, there being no pressure differential applied to the carriage during such joint piston movement. Accordingly, the pressurization system constantly biases the centering pistons into substantially simultaneous engagement with both the inner carriage and the outer stop at all times when the centering assembly is activated and in its selected center position so that there is no significant slack or drift at any time during its operation.

Figure 10:
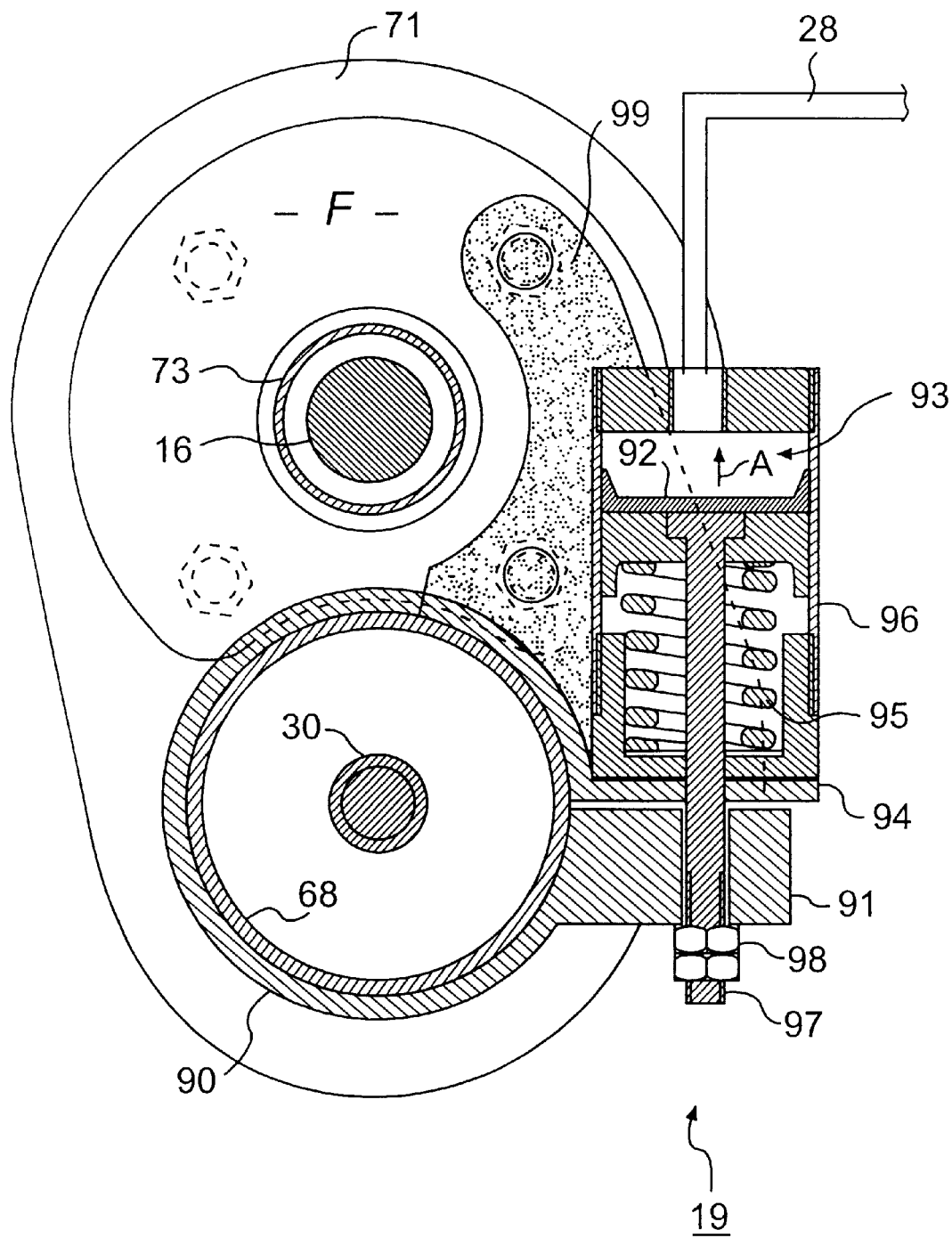
FIG. 10 is a transverse sectional view taken along lines 10—10 of FIG. 2 and shows the trim assembly connected to the centering assembly by a clamping band.
Figure 11:
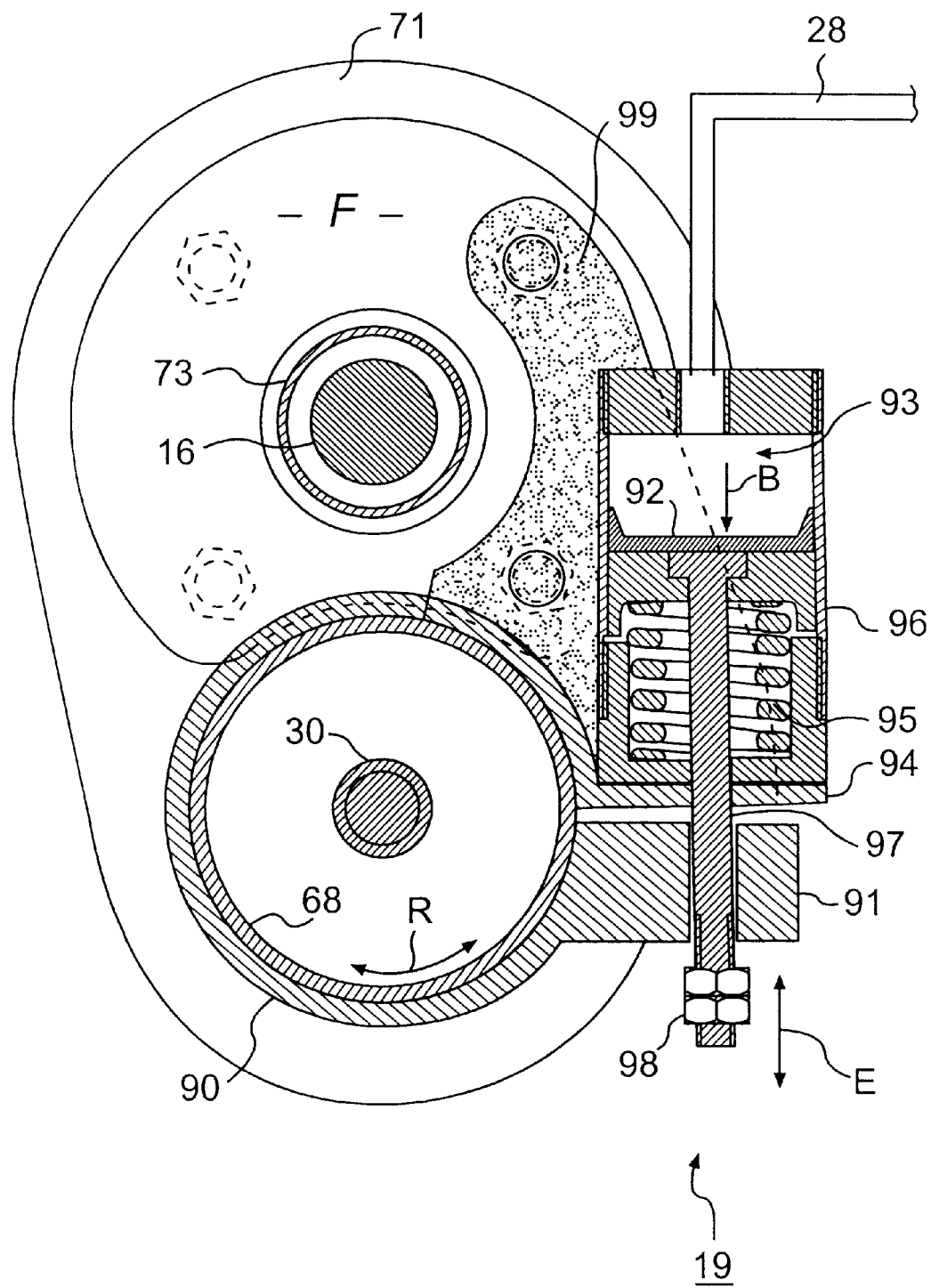
FIG. 11 is the same sectional view as FIG. 10, except the clamping band has been loosened by fluid pressure against a trim piston.

A particularly important feature of the invention is the provision of means to remotely "trim" the center position of the steering system, and thereby the center of the steerable wheels of the vehicle, in order to compensate for changes in extraneous steering forces that would otherwise cause the vehicle to drift off of its straight ahead course unless opposed by driver manipulation of the steering wheel. Thus, the centering system 15 also includes a trim assembly 19 comprising a trim cylinder 96 mounted on the mounting plate 71 by a bracket 99, and a clamping band 90 passing around the centering cylinder 68 and having a trim flange 91, as shown in FIGS. 10 and 11. A trim piston 92 reciprocates in a trim chamber 93 which may receive compressed air from line 28 and is biased toward a clamping position by a compression spring 95. A bolt 97 serves as a piston rod and passes through an aperture in a trim flange 91, to which it is secured by nuts 98. The bolt or piston rod 97 also passes through the lower end wall of the trim cylinder, such that this end wall serves as a stationary flange 94, which may be separate from or integral with the end wall.

The trim assembly 19 also includes the trim valve 36, which is connected to trim chamber 93 by air line 28 and is actuated by the trim button 38 on control panel 40. Panel 40 is preferably located at or near the driver's station of the vehicle. The trim button 38 may mechanically actuate valve 36 or it may actuate an electrical switch to operate a solenoid for moving valve 36 to its open position. Button 38 is preferably of a design that is spring-biased to a line opening position for venting air line 28 and depressurizing chamber 93. Thus, line 28 is pressurized only momentarily when the button 38 is held in a depressed position against the spring bias to open valve 36 for connecting line 28 to supply line 25. Release of the button 38 closes valve 36 to isolate line 28 from line 25 and simultaneously vents line 28 to the atmosphere via a vent hole 100. This stops the trim adjustment at the point selected when button 38 is released.

Trimming is accomplished by releasing the piston cylinder 68 of the centering unit 64 so that it may rotate in either direction as illustrated by the double-ended arrow R in FIG. 11. As previously indicated, the trimming assembly 19 includes the clamping band 90 with trim flange 91 projecting laterally from and affixed to the clamping band 90 that passes around centering cylinder 68. The distal end of flange 91 is connected by the rod 97 to the piston 92 and rod 97 is extended and retracted in the direction of the double-ended arrow E by corresponding movement of piston 92 in chamber 93. When chamber 93 is vented, rod 97 is retracted by piston 92 which is then pushed upward in the direction of arrow A by spring 95, such that cylinder 68 is clamped in a fixed position relative to the vehicle frame as shown in FIG. 10.

When chamber 93 is pressurized, rod 97 is extended by piston 92 which is then pushed downward in the direction of arrow B and compresses spring 95, such that clamping band 90 is loosened so that cylinder 68 is free to rotate in either direction as shown in FIG. 11. The effect of such rotational movement of the centering cylinder 68 is to rotate the ball nut 33 around the ball screw 32 and thereby change the angular position of the guide rail 37 relative to the angular position of the input shaft 30 when the centering pistons 69 and 70 are in their rest positions against the stop plate 39) which in turn changes the center position of the vehicle steering system. Thus, rotation of the centering cylinder 68 of the present invention has the same trimming effect as rotation of the centering cylinder in my earlier U.S. Pat. No. 5,816,594, the entire contents of which are incorporated herein by reference.

The remotely controlled trim assembly 19 operates as follows. If there is a roadway pull to the right, straight ahead travel will require a compensating steering force to the left from the steering shaft 16 to provide straight ahead travel of the vehicle. While holding the steering wheel (not shown) to the left in a position giving straight ahead travel, the trim button 38 is pushed momentarily to pressurize chamber 93 for a brief trimming interval during which clamping band 90 is released to allow centering cylinder 68 to rotate to a new center position relative to the input shaft 30 and to the vehicle frame as represented by the stabilizer strut 75. Following this brief trimming interval, trim button 38 is released to depressurize chamber 93 and tighten band 90 to clamp centering cylinder 68 in its new position so that the steering system will remain in the new "trimmed" position when the steering wheel is released by the driver.

When the steering wheel has to be held away from the old center position to achieve straight ahead travel, a corresponding one of the pistons 69 and 70 is moved away from its rest position and is therefore biased toward its rest position against stop plate 39 by the fluid pressure in its cylinder chamber. The invention may be modified to utilize resilient means other than fluid pressure for causing the opposing pistons to exert the respective resistance and return forces on the ball screw 33. For example, vent hole 86 may be replaced by a vacuum connection for connecting the intermediate chamber 80 to a vacuum line from a vacuum source, such as the manifold of an internal combustion engine. A vacuum would thereby be provided in the chamber 80 during vehicle operation, and this vacuum would create a suction tending to hold the pistons 69 and 70 against the stop plate 39, such that these pistons would provide a resistance force resisting movement of the ball screw 33 away from its center position, and a return force biasing the ball screw 33 back toward its center position upon rotation of the steering wheel away from the center position. In this modified embodiment, the respective end chambers 61 and 62 would be vented to ambient pressure around the respective input and idler shafts 30 and 31 to prevent any pressure build up in these chambers that could otherwise interfere with the desired movement of pistons 61 and 62.

In another modification, the respective end chambers 61 and 62 may contain coil springs for engaging the respective pistons 69 and 70 such that these pistons are biased against the stop plate 39 so as to oppose their movement away from center and thereby provide the resistance and return forces for operation of the invention in the manner previously described. In this alternative embodiment, the respective end chambers 61 and 62 are also vented to ambient pressure around the respective input and output shafts 30 and 31 to prevent any pressure build up in these chambers that could otherwise intefere with the desired movement of pistons 69 and 70.

Figure 12:
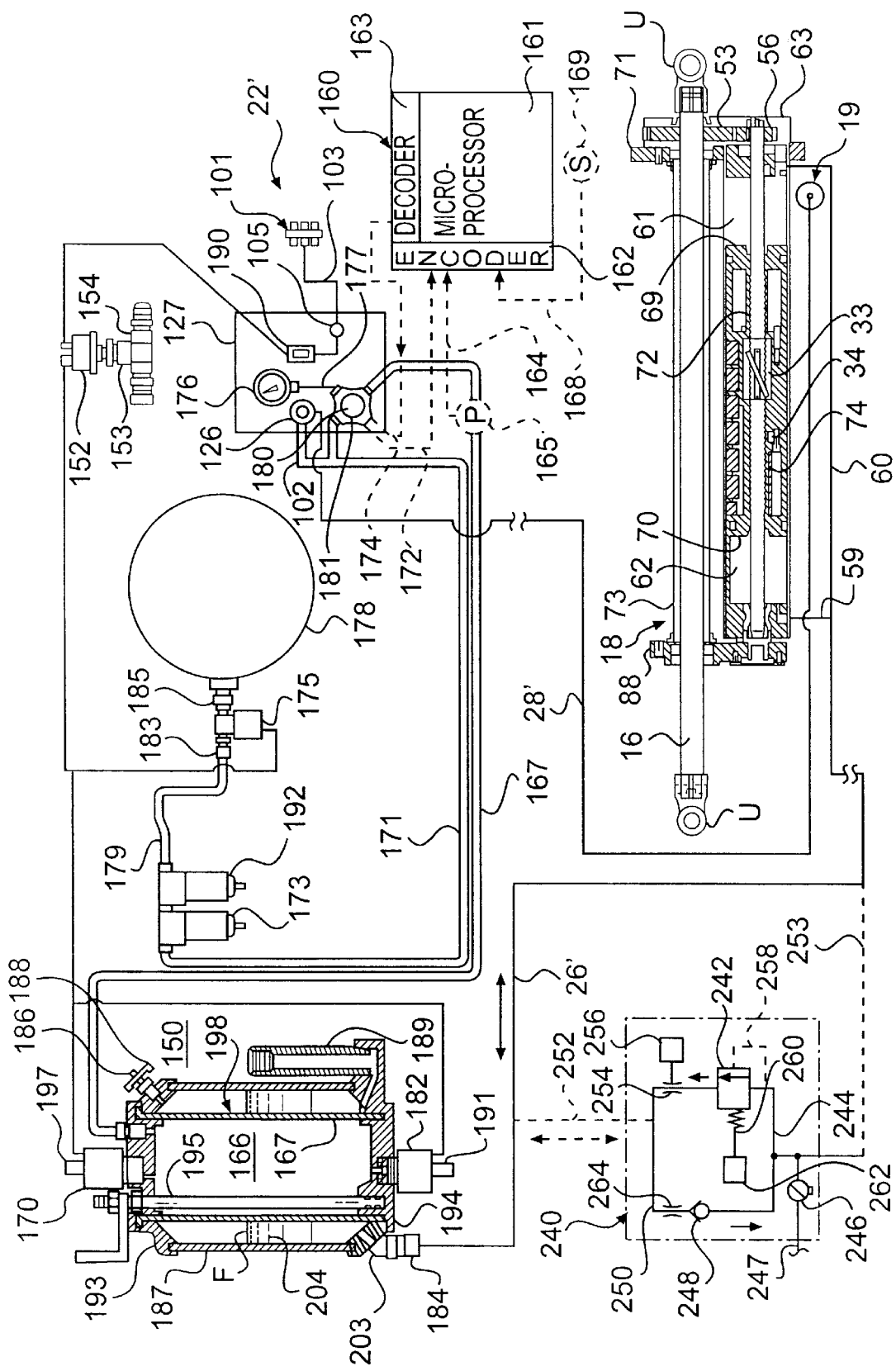
FIG. 12 is a schematic diagram of a modification of the fluid and electrical systems for operating the centering assembly and trim assembly of the invention.

A further modification of the invention is illustrated in FIG. 12 wherein an accumulator 150 is used to provide a pressurized liquid to the pressure chambers 61 and 62 of the centering assembly 18. The accumulator 150 has an annular liquid chamber 204, a central gas chamber 166 separated from the liquid chamber by a flexible bladder 167, and solenoid operated upper and lower gas dump valves 170 and 182. Bladder 167 is preferably made of neoprene. A liquid centering fluid may be desirable in some applications because it is substantially incompressible as compared to a gaseous centering fluid and therefore provides the capability of providing greater resistance to turning movements of the steering wheel.

Accumulator 150 also includes an upper head 193 and a lower head 194 spaced apart by an outer housing wall 187 and secured together by peripherally spaced bolts 195, only one of which is shown in FIG. 12. Gas chamber 166 is connected to a compressed gas source 178 via a conduit 167, a pressure regulator 181, a conduit 171, a dryer 173, a particle filter 192, a conduit 179, a check valve 183, a solenoid operated cut-off valve 175, and a restrictor orifice 185 for limiting the flow rate to regulator 181. As an alternative, the components 173, 175, 178, 179, 183 and 185 of FIG. 12 may be replaced by components of the air supply assembly 20 of FIG. 1.

The gas pressure in chamber 166 is indicated by a pressure gauge 176 which is connected to pressure regulator 181 by a conduit 177. The gas is preferably air, and both the bladder 167 and the surrounding housing wall 187 of accumulator 150 are preferably cylindrical. The gas pressure source 178 may be any pressurized air source, such as the compressed air tank of an air brake system of the type used on large trucks and specialty vehicles for hauling heavy equipment. The gas pressure is regulated by a control knob 180 on the driver control panel 127. Pressurized air from conduit 171 is supplied via a conduit 102 to a trim valve 126 that is connected by air line 28' to the trim unit 19 and operates this unit in the same manner as trim valve 36 of FIG. 1.

Gas chamber 166 should be large enough for liquid chamber 204 to receive the entire volume of liquid from either chamber 61 or chamber 62 without unduly collapsing bladder 167. A bleed passage 186 containing a normally closed vent cock 188 allows liquid chamber 204 to be partially filled with hydraulic fluid up to the level of the top of a filler neck 189.

Gas pressure in chamber 166 acts through bladder 167 to store fluid energy received from the hydraulic side of the system, and to maintain fluid pressure on the liquid side of the respective pistons 69 and 70 until such time as the gas pressure is released to ambient atmosphere by actuation of dump valves 170 and/or 182 in response to turning off the system with an on-off switch 190. Switch 190 is connected to an electrical buss 101 by a line 103 containing a circuit breaker 105. The lower dump valve 182 includes a drain line 191 and has the dual purpose of discharging both gas and any liquid (such as condensed water) accumulating in gas chamber 166. A pressure relief valve (not shown) may communicate with the gas chamber side of the accumulator to provide an upper limit to the resistance and return forces that may be generated by contact between the respective pistons and the carriage assembly 34 therebetween.

The air pressure in the accumulator 150 is automatically recharged each time the system is turned on, thereby eliminating a recharge maintenance function. The gas chamber 166 of pressure accumulator 150 is protected from contaminants and moisture by suitable air filters 173 and dryers 192. On systems supplied by an air compressor, such as shown in FIG. 1, the discharge from the upper accumulator dump valve 170 may be routed to a compressor inlet filter (not shown) for providing a backflush function to keep this compressor filter clean.

As it is best to deactivate the centering assembly 18 in the event of a failure of the power steering system, a switch 152 for interrupting electrical power to solenoid valves 170, 182 and 175 may be provided for vehicles with power steering systems. Switch 152 is mounted on a pressure sensor 153 located in a hydraulic line 154 in fluid communication with the outlet of the power steering pump (not shown). A loss of pressure at the pump outlet causes switch 152 to open, thereby causing gas supply valve 175 to close and dump valves 170 and 172 to open for depressurizing gas chamber 166, which in turn depressurizes liquid chamber 204 and centering chambers 61 and 62 connected thereto. Vent lines 191 and 197 are each preferably of larger capacity than gas supply conduit 167 to ensure that gas chamber 166 will be depressurized even if gas supply valve 175 fails to close and either dump valve 170 or 182 fails to open with the opening of pressure switch 152.

Accumulator 150 also allows hydraulic pressure in the centering chambers 61 and 62 to be precisely varied over a relatively wide range because the gas trapped in gas chamber 166 provides a spring-like return force and this chamber may be sized such that the return force does not vary significantly with compressive movement of pistons 69 and 70. The gas pressure control may comprise a manual throttle valve (not shown) between conduits 171 and 167, in combination with the pressure gauge 176 to indicate accumulator pressure. Alternately, the pressure regulator 181 may be used for maintaining a manually selected system pressure. The control knob 180 is provided to permit varying the pressure settings of the regulator by hand. By varying the gas pressure in gas chamber 166 through adjusting pressure regulator 181, the break away resistance and the centering return force produced by the compensator of the invention can be increased or decreased as desired. The range of pressures available should be selected so that break away resistance can be varied from relatively low at low speeds to relatively high at high speeds.

After linear movement of the ball nut carriage 33 is initiated upon breakaway from the selected center position, the steering force required to sustain movement is a function of the pressure in the accumulator 150, as well as of other centering phenomena acting on the steering system, such as positive wheel caster. Also after break away, accumulator pressure acting on the off-center piston provides a return force that is effective over the entire range of turning angles, which for highway vehicles is usually limited to about 45° on either side of the center position (the 0° position) of the steerable front wheels.

As an alternative to manual adjustment, the output pressure of regulator 181 may be adjusted by a reversible electric motor (not shown) controlled by an on-board computer 160, which comprises a microprocessor 161, an encoder 162 and a decoder 163. Encoder 162 converts to digital signals an analog signal 164 inputted from a pressure sensor 165 in the gas supply conduit 167, an analog signal 168 inputted from a vehicle speed sensor 169, and an analog signal 172 inputted from a position sensor (not shown) within regulator 181. Decoder 163 converts digital control signals generated by microprocessor 161 into an analog signal 174 for controlling the reversible electric motor which adjusts the output pressure provided by regulator 181. The gas pressure in gas chamber 166 and the resulting resistance and centering forces are thereby made automatically responsive to the speed of the vehicle to provide "speed sensitive centering" of the vehicle's steering system. It is preferable that the resistance to turning movements away from the center position be increased automatically as the speed of the vehicle increases because the effects of small off-center movements in response to spurious steering inputs increase dramatically with vehicle speed.

As an alternative to supplying the pressurized liquid directly from the accumulator inlet/outlet fitting 184 to the centering assembly 18 via a direct two-way flow line 26', an alternate centering fluid system 240 may be used to provide additional power centering features. Thus, an additional level of resistance to be overcome before turning movement may be initiated is provided by a pressure differential valve 242 in a return conduit 244 also containing an orifice 254.

Although accumulator pressure alone will resist off-center movement of the pistons 69 and 70 in the absence of a pressure differential valve, this valve may be used so that the steering force required to make a turning movement away from center is substantially higher than the return force for returning the system to center upon removal of the steering force. Until pressure in one of the centering chambers 61, 62 exceeds the setting of valve 242, movement of both pistons is prevented by fluid trapped in the centering chambers by this valve and by a check valve 248 in a one-way supply conduit 250. A solenoid operated dump valve 246, which may be actuated by switch 152, will release any residual centering chamber pressure through a drain line 247 in the event of a failure in the power steering system.

When the pressure setting of differential pressure valve 242 is reached, fluid then flows through conduit 244 and a conduit 252 into accumulator liquid chamber 204. Valve 242 is preferably of the spring biased type and broken line 258 represents a pilot line through which centering chamber pressure is applied until it overcomes the force of a diaphragm spring 260 and opens the valve. The pressure setting of this valve can be varied by adjusting the spring tension, and the valve may include a remotely controlled solenoid 262 so that the pressure differential can be manually or automatically varied in accordance with vehicle speed. Once opened, valve 242 preferably remains open until fluid pressure in conduits 252 and 253 are equalized by cessation of a turning movement away from center.

The orifice 254 may be used to control the rate of fluid flow out of the respective centering chambers when valve 242 is open. Orifice 254 may be fixed or variable in size and in either case provides a flow resistance that varies in response to the rate of piston movement. If orifice 254 is of variable size, it may be operated by a remotely controlled solenoid 256 to make its flow restriction controllably variable in response to vehicle speed or to a manual selector. Orifice 254 may comprise a solenoid operated throttle valve or a multiported valve with different size outlet orifices. Both the orifice solenoid 256 and the valve solenoid 262 may be controlled automatically by the on-board computer 160 through the use of inputs and outputs similar to those already described for automatically controlling pressure regulator 181.

The pressurized hydraulic fluid available from the accumulator 150 is transmitted to the centering chambers 61 and 62 through the inlet/outlet conduit 252 and supply conduits 250 and 253. This accumulator energy provides the return force for reseating pistons 69 and 70 in their retracted positions upon removal of intentional steering inputs. Should the rate of piston return to center be too rapid and cause the steering system to overshoot its center position, an orifice 264 may also be installed in supply conduit 250 to control the rate of fluid flow into the respective centering chambers. However, such flow restrictions should not prevent a relatively free return of all components to center.

Although alternative fluid system 240 is optional, the differential pressure valve 242 is an important feature because it may provide improved centering stability and steering control. The steering force may vary within the range of resistance represented by valve 242 without generating any steering movement. This valve then opens at its set point and then remains open as long as any positive pressure differential exists between the pressure chambers 61 and 62 and the accumulator pressure in chamber 166. It will therefore remain open while a centering piston is moving away from center and will close when such movement stops because continued flow through orifice 254 will eliminate the positive pressure differential.

Thereafter, when the steering force drops below the opposing return force generated by accumulator pressure through supply conduit 250, the off-center piston returns to its retracted position as fluid flows from the accumulator through check valve 248. Differential pressure valve 242 in combination with accumulator 150 therefore provides a static resistance force greater than the dynamic resistance force provided by fluid flow into the accumulator. The term "static" is used to distinguish this force from the dynamic and variable resistance force provided by orifice 254 in response to the rate of fluid flow produced by movement of a centering piston. By comparison, the static resistances provided by initial accumulator pressure and the set point of valve 242 are both present without fluid flow.

A number of modifications, changes and alterations to the centering and trimming units and their associated systems, in addition to those already described, as possible without departing from the scope of the present invention. By way of further example, the compression spring 95 of the centering assembly could be replaced by a second piston and a second compression chamber in opposition to piston 92 and chamber 93, and valving in air lines could be provided to pressurize either chamber and exhaust the opposite chamber so as to use fluid pressure to cause reciprocation of rod 97 relative to the trim cylinder 96. Furthermore, the rod 97 could be arranged to push rather than pull flange 91 toward flange 94. In addition, the clamping band 90 or the trimming cylinder 96 could be provided with gear teeth arranged to be engaged by a driven gear and the driven gear could be driven by a gear train actuated either by rod 97 or by a reversible electric motor, in which case the trimming air system would be replaced by an electrical system, such as that used to actuate the trimming motor in my prior U.S. Pat. No. 5,816,594.

In addition, the resistance and return force components of the invention can be used alone as a centering unit without the remote trimming feature. On the other hand, the remote trimming feature of the invention is useable not only with the centering unit disclosed herein, but also in combination with other centering mechanisms, such as those described in my prior U.S. Pat. No. 5,816,594. In addition, a number of other modifications to both the centering assembly components and the trim assembly components specifically described herein are possible without departing from the scope of the invention, as defined by the claims below.

What is claimed is:

1. An apparatus for positioning at least one steerable member mounted on a frame for movement to either side of a selected position, said apparatus comprising:

a screw member having a spiral thread and fixed between an input shaft and an idler shaft, said screw member being rotatable with said input and idler shafts and the rotational position of said screw member defining said selected position;

gear means for connecting said input shaft to a rotatable steering shaft for rotation therewith, said steering shaft being arranged to cause movement of said steerable member in response to movement of a steering member;

centering cylinder means for providing first and second centering chambers;

a first piston arranged for reciprocating movement in said first centering chamber, and a second piston arranged for reciprocating movement in said second centering chamber, each of said first and second pistons being arranged to move independently of the other between a retracted position and a compressive position for compressing a resilient means within its corresponding chamber, said resilient means when compressed applying a resilient force opposing compressive movement of the corresponding piston; and, thread engaging means for engaging said spiral screw thread to transmit said resilient force from said first and second pistons to said screw member, said thread engaging means comprising a reciprocating carriage means arranged for movement to either side of a neutral position corresponding to said selected position, and a screw follower member for causing said carriage means to engage each of said pistons independently of the other, said follower member engaging said screw threads so that rotation of said screw member in one direction causes said carriage means to move to one side of said neutral position and produce compressive movement of said first piston without moving said second piston and rotation of said screw member in the other direction causes said carriage means to move to the other side of said neutral position and produce compressive movement of said second piston without moving said first piston;

said transmission of said resilient force to said screw member causing said steering shaft to provide a resistance force resisting steering forces tending to move said steerable member to either side of said selected position.

2. An apparatus according to claim 1, wherein said centering cylinder means comprises a centering cylinder, wherein said screw member and said follower member are positioned in said centering cylinder between said first and second pistons, and wherein said screw member is mounted for rotation relative to said centering cylinder.

3. An apparatus according to claim 2, wherein at least one of said carriage means and said centering cylinder has a guide rail extending in a direction parallel to the axis of said centering cylinder, and wherein the other of said carriage means and said centering cylinder has a ball bearing assembly cooperating with said guide rail to guide axial reciprocation of said carriage means, said follower member being fixed to said carriage means so that rotation of said follower member relative to said centering cylinder is prevented by said rail and bearing assembly cooperation when said screw member rotates relative to said centering cylinder.

4. An apparatus according to claim 2 further comprising trim means for varying the selected position of said steerable member, said trim means comprising:

mounting means for supporting said centering cylinder for rotation jointly with said screw member relative to said frame;

guide means for preventing relative rotation between said carriage means and said centering cylinder while providing for reciprocating movement of said carriage means parallel to the axis of said centering cylinder, said follower member being fixed to said carriage means such that said joint rotation changes the neutral position of said carriage means relative to a corresponding neutral position of said screw member;

and engaging means for engaging said centering cylinder at selected arcuate positions to prevent said joint rotation by holding said centering cylinder in fixed relation to said frame.

5. An apparatus according to claim 4, wherein said trim means further comprises actuator means for causing said engaging means to engage said centering cylinder in response to at least one remote input and thereby prevent said joint rotation, and control means for selectively providing said at least one remote input to said actuator means from a location remote to said centering cylinder, such as a driver's station of a vehicle.

6. An apparatus according to claim 5, wherein said engaging means comprises a clamping band extending around at least a major portion of the circumference of said centering cylinder and having separated ends each with a clamping member, and wherein said actuator means comprises a movable member movable between a clamping position in which said movable member causes said clamping members to move together for tightening said clamping band around said centering cylinder and a release position in which said movable member causes said clamping members to move apart for loosening said tightened clamping band.

7. An apparatus according to claim 6, wherein said movable member is a rod connected to a trim piston and to at least one of said clamping members to cause said clamping member movement in response to reciprocation of said trim piston in a corresponding trim cylinder having at least one pressure chamber; wherein said actuator means further comprises fluid means for providing a pressurized fluid in said pressure chamber to produce a first movement of said trim piston that causes one of said clamping member movements, and return means for producing a second movement of said trim piston that causes the other of said clamping member movements when said pressurized fluid is not provided in said pressure chamber; and wherein said control means comprises means for selectively causing said fluid means to pressurize said pressure chamber with said pressurized fluid.

8. An apparatus according to claim 7, wherein said return means comprises a resilient member arranged to be compressed by said first piston movement and when compressed to provide a return force for causing said second piston movement upon a release of said pressurized fluid from said pressure chamber, and wherein said fluid means includes means for providing said release in response to said control means.

9. An apparatus according claim 8, wherein said resilient member comprises a compression spring for providing a spring force opposing said first piston movement.

10. An apparatus according to claim 1, wherein said resilient means comprises pneumatic means for providing a pressurized gas in said first and second centering chambers.

11. An apparatus according to claim 1, wherein said resilient means comprises hydraulic means for providing a pressurized liquid in said first and second centering chambers.

12. An apparatus according to claim 1 further comprising control means for changing the amount of said resilient force by varying from a location remote from said centering cylinder means an amount by which said resilient means presses against said first and second pistons.

13. An apparatus according to claim 12, wherein said control means comprises means for manually adjusting the amount by which said resilient means presses against said first and second pistons.

14. An apparatus according to claim 12, wherein said control means comprises means responsive to a sensed condition for automatically adjusting the amount by which said resilient means presses against said first and second pistons.

15. An apparatus according to claim 12 for use on a vehicle having a steering system comprising said at least one steerable member, wherein said control means comprises means responsive to a detected speed of said vehicle for automatically adjusting the amount by which said resilient means presses against said first and second pistons.

16. An apparatus according to claim 1, wherein said resilient means comprises fluid means for providing a pressurized fluid in each of said first and second centering chambers so that fluid pressure provides said resistance force by opposing movement of said steerable member toward either side of said selected position and provides a return force continuously biasing said steerable member toward said selected position during movement of said steerable member to either side of said selected position, said fluid pressure causing said pistons to bias said carriage means toward said neutral position during a compressive movement of either of said pistons in its corresponding centering chamber.

17. An apparatus according to claim 16, wherein said fluid means includes means for controllably varying said fluid pressure so as to vary at least one of said resistance force and said return force.

18. An apparatus according to claim 16, wherein said fluid is a liquid and said liquid flows to and from said centering chambers via centering conduit means, and wherein said centering conduit means comprises a pressure actuated valve means for preventing fluid flow from said centering chambers until engagement between said carriage means and one of said first and second pistons produces a fluid pressure differential above a pressure provided by a pressurizing means.

19. An apparatus according to claim 18, wherein said pressure actuated valve means includes means for controllably varying the amount of said fluid pressure differential.

20. An apparatus according to claim 16 for use on a vehicle having a steering system comprising said at least one steerable member, wherein said fluid means comprises pressurizing means for providing a pressurized liquid in said first and second centering chambers, wherein said pressurizing means comprises gas pressure means for applying pressure of a pressurized gas to said liquid in a liquid reservoir and control means for automatically adjusting the amount of said gas pressure in response to the speed of said vehicle.

* * * * *